Figures 1A, 1B:
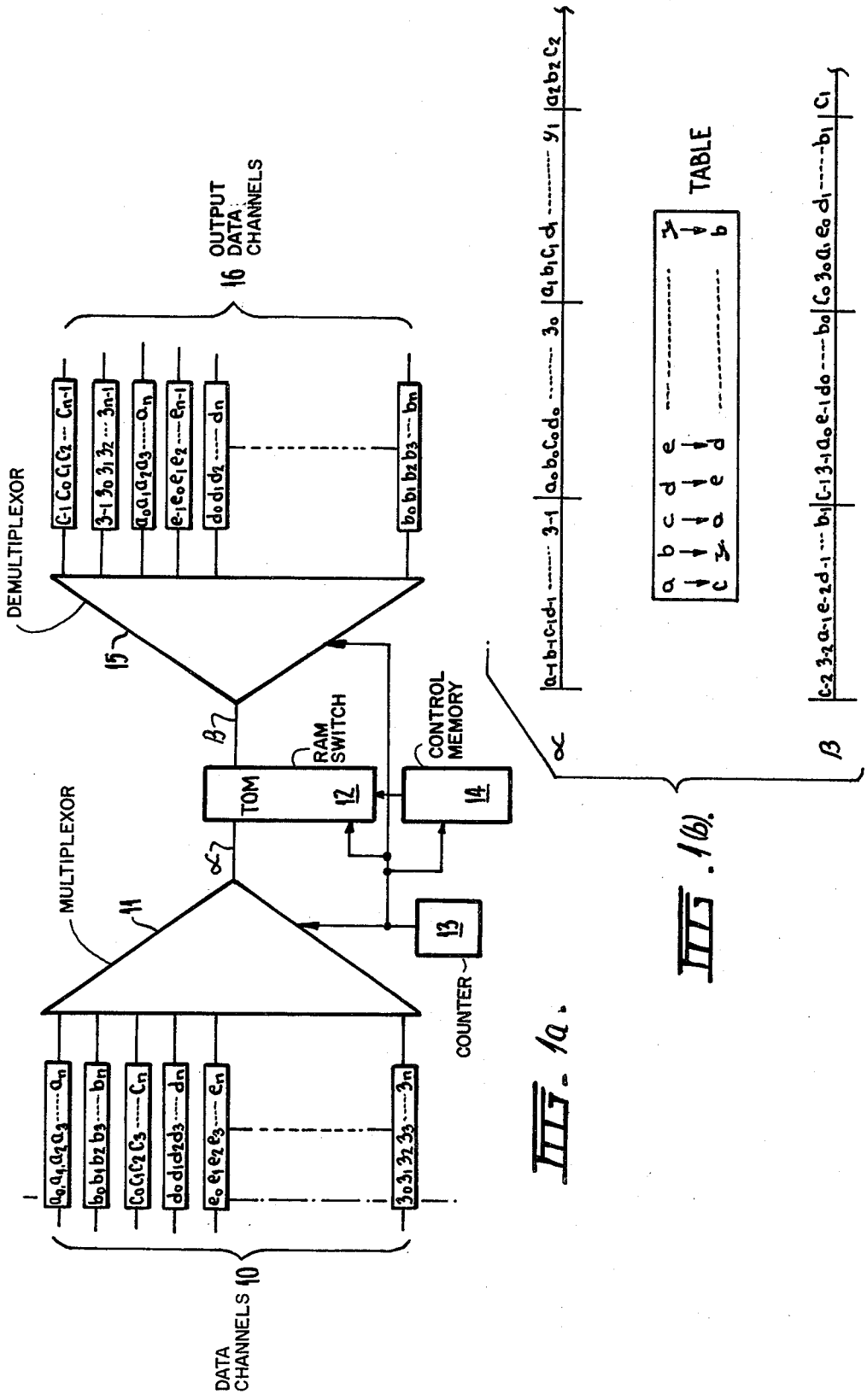

United States Patent [19]

Herschtal

[11] 4,179,587
[45] Dec. 18, 1979

[54] BIT SWITCHING OF WORD FORMATTED DATA

[75] Inventor: Ludwik Herschtal, North Balwyn, Australia

[73] Assignee: L. M. Ericsson Pty. Ltd., Broadmeadows, Australia

[21] Appl. No.: 911,481

[22] Filed: Jun. 1, 1978

[30] Foreign Application Priority Data

Jun. 20, 1977 [AU] Australia ............................. PD0511

[51] Int. Cl.$^2$ ........................................... H04Q 11/04
[52] U.S. Cl. .............................. 179/15 AT; 179/15 AQ
[58] Field of Search ........ 179/15 AT, 15 AQ, 15 BS; 325/395, 475; 333/29

[56] References Cited

U.S. PATENT DOCUMENTS

| | | | |
|---|---|---|---|
| 3,596,246 | 7/1971 | Nakagome | 179/15 AT |
| 3,914,552 | 10/1975 | Neufang | 179/15 AT |
| 3,930,124 | 12/1975 | Lutz | 179/15 AT |
| 4,071,701 | 1/1978 | Leijonhufvuo | 179/15 AT |

*Primary Examiner*—David L. Stewart
*Attorney, Agent, or Firm*—Cushman, Darby & Cushman

[57] ABSTRACT

A digital switch for switching word formatted PCM digital data is disclosed. The data of each PCM word is serially bit switched rather than being switched in parallel as in conventional PCM switches. This is achieved by time multiplexing corresponding word bits of respective incoming channels or inlets onto a single data highway to form a bit interleaved digital bit stream. Data on the highway is switched through a RAM under control of a control memory according to the required connections so as to rearrange the order of the data bits. The rearranged data is demultiplexed to the respective outgoing channels or outlets. To avoid less of alignment of word boundaries at the outlets, as between respective channels, the switch determines those connections which incur a switch cycle delay relative to those which do not. This is done by comparing the read and write address controlling the switch memory and when the write address is equal to or greater than the read address the particular bit being switched is delayed on the highway by one cycle. In the converse situation the delay has already occurred in the RAM and no further delay is introduced. The delay is caused by a delay equalizer circuit including a further RAM which receives all data on the highway and introduces a one cycle delay thereto. A by-pass connection enables data on the highway to by-pass the further RAM and hence avoid the delay. An AND/OR select gate selects data from the further RAM or the by-pass connection as the case may be. Thus all data through the switch incurs an equal delay. A synchronization signal at the switch input, for word aligning the data, is delayed by one cycle at the switch outlet. A method for switching data is also claimed.

4 Claims, 3 Drawing Figures

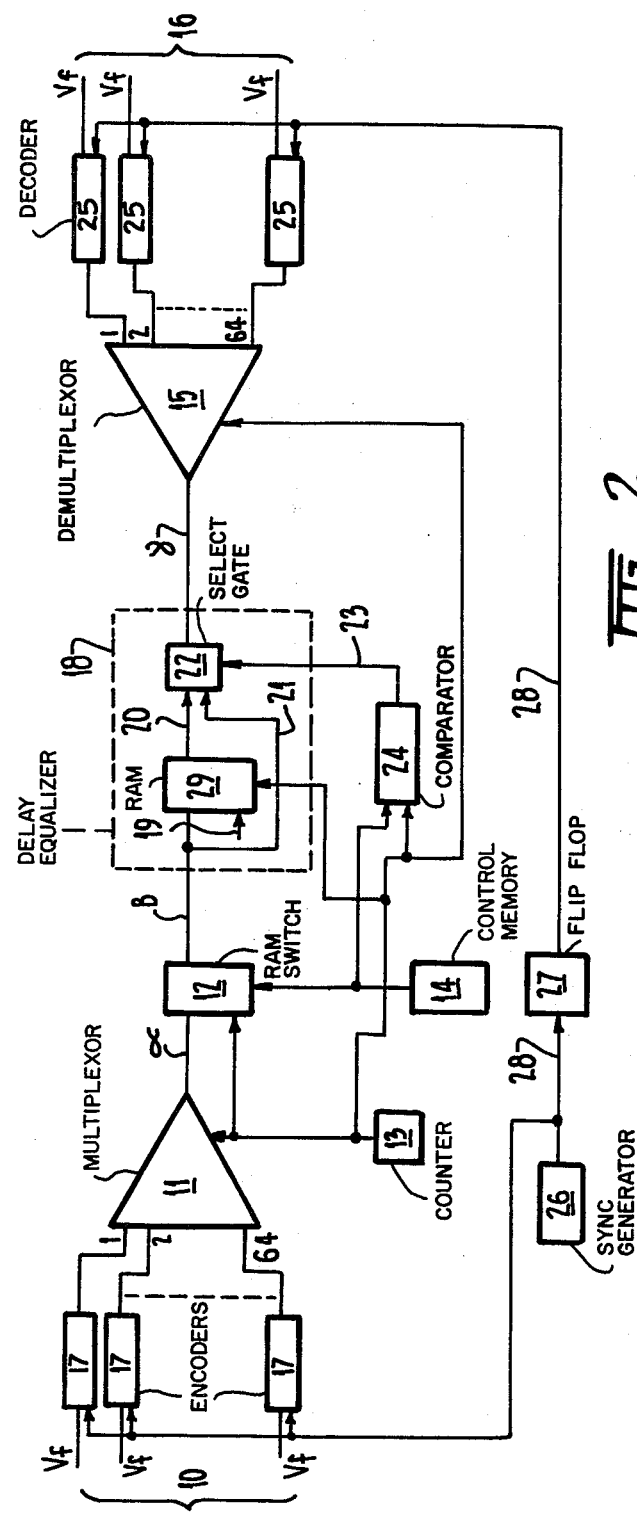
FIG_2.

BIT SWITCHING OF WORD FORMATTED DATA

This invention relates to digital data switches and in particular to a method and apparatus for serially bit switching word formatted data such as, for example, voice data of the PCM (Pulse Code Modulated) type.

Of course bit switches suitable for switching unsynchronized data such as delta modulated data are well known and are widely used, for example, in small telephone exchanges. However, such bit switches are not suitable for switching word formatted data because the word boundary information of incoming channels to the switch will not be maintained for all outgoing channels. This loss of information occurs because data through the switch on some connections is delayed by one switch cycle time (that is a one bit time delay at the input channel bit rate) as will be appreciated by those skilled in the art.

Conventionally, switches for switching digital word formatted data such as PCM data comprise a switch wherein the data is transferred in word format by switching the bits of each word simultaneously in parallel through the switch. Such a switch is inefficient in smaller applications in that it requires an identical path for each data bit of each word. It is also necessary to convert the serially generated incoming data to the switch into parallel form for switching and vice versa after switching. This further adds to th complexity and hence the cost of a parallel word switch.

An alternative means for switching word formatted data is described in applicant's co-pending U.S. Pat. application Ser. No. 833,892 filed on Sept. 16, 1977. The co-pending application describes a switch having a synchronization by-path for switching synchronization information separate from each word and is intended for use with remote per channel codecs (encoders/decoders) which are not word synchronized (word aligned), that is, the word boundaries arrive at the switch at random instants of time. Whilst a switch of the type having a synchronization by-path provides a simple bit-switch suitable for switching word formatted data in serial form the switch does require effectively a duplication of the data path through the switch. The duplication makes the switch inefficient particularly when larger switch sizes are contemplated.

Accordingly it is an object of the present invention to provide a method for serially bit-switching digital word synchronized (word aligned) data, which method is particularly suitable for use in applications with per channel codecs in close proximity to the switch to avoid the aforementioned inefficiencies of the alternative switches described.

It is a further object of this invention to provide a digital data switch for serially bit-switching digital word synchronized (word aligned) data, which switch is particularly suitable for use in smaller applications to avoid the aforementioned inefficiencies.

Thus the invention provides a method for serially bit-switching digital word synchronized (word aligned) data between inputs and outputs of a digital switch comprising the steps of converting data from different incoming channels to said switch into a bit interleaved bitstream on a single data highway, bit-switching said bitstream via a switch memory, determining those bits which incur a switch memory delay as opposed to those bits which do not incur a said delay, applying a said delay to said bits which do not incur said delay, and applying a said delay to a synchronization signal for synchronizing the word boundary of outgoing data from the switch relative to a synchronization signal for synchronizing the word boundary of incoming data to the switch.

The invention also provides a switch for serially bit-switching digital word synchronized (word aligned) data between inputs and outputs of said switch, wherein said switch comprises circuit means for converting data from different incoming channels to said switch into a bit interleaved bitstream on a single data highway, a switch memory for receiving sequentially said data from said highway and bit switching said data to rearrange the order of data in said bitstream according to connections to be made through the switch, further circuit means for determining those bits through the switch which incur a switch memory cycle delay as opposed to those bits which do not incur a said delay, a delay equalizer circuit for applying a said delay to those bits which do not incur a switch memory cycle delay and a delay compensator circuit for delaying a synchronization signal for synchronizing the word boundary of outgoing data from the switch relative to a synchronization signal for synchronizing the word boundary of incoming data to the switch.

In order that the invention may be more readily understood one particular embodiment will now be described with reference to the accompanying drawings wherein, FIG. 1 (a) is a schematic circuit block diagram of a basic known bit switch showing word synchronized (word aligned) PCM data at the inputs thereto and the effects of bit switching said data causing loss of synchronization on some channels, FIG. 1 (b) shows the arrangement of data on highway $\alpha$ of FIG. 1 (a) and the arrangement of data on the highway $\beta$ of FIG. 1 (a) as a result of channel connections shown in the table and FIG. 2 is a basic circuit block diagram of the embodiment of this invention.

Referring to FIGS. 1 (a) and (b) a number of incoming data channels 10 are multiplexed by multiplexor 11 onto a single data highway $\alpha$. The data on highway $\alpha$ is bit interleaved data as shown in FIG. 1 (b) i.e. the bitstream on $\alpha$ is from each incoming channel in sequence. Data on the highway $\alpha$ is written sequentially into RAM switch 12 under control from binary counter 13. The data is read from the RAM switch 12 under control of control memory 14 according to the particular connections to be established. The data from 12 appears on highway $\beta$ in rearranged order according to the connections and is demultiplexed by demultiplexer 15 under control of the binary counter 13 to respective outputs 16.

If the connection through the switch is such that the control memory address from 14 is greater than the address from binary counter 13 at a particular instant of time then the data through the switch will be delayed by one cycle of the RAM 12, that is, one bit delay at the incoming channel bit rate. If $a_0$ $b_0$ $c_0$ etc. represent the word boundaries of each channel which are synchronized on all incoming channels 10 as shown the position of the word boundaries is unknown at the output side as some connections suffer the delay as shown.

With single channel codecs the synchronization pulse which is used to synchronize the encoders (not shown) at the input must also be applied at the correct point in time to the decoders (not shown) at the output. This is not possible however if the word boundary positions at the decoders are unknown as occurs with the known bit switch shown in FIG. 1 (a).

Reference should now be made to FIG. 2 which shows an embodiment of the present invention. In FIG. 2 the parts of the switch corresponding to the switch of FIG. 1 (a) are numbered correspondingly and will not be described again. The switch of FIG. 2 has sixty-four inlets each with its own discrete encoder 17 for converting Vf signals to PCM digital signals. Data into multiplexor 11 is at 64 K bit/$_s$ and thus data on the highways α and β is at 4.096 M bits/$_s$.

As explained above data on highway β is rearranged in order and some bits are delayed by a cycle of switch memory 12, that is 16 μS, which is the bit period of incoming data. In order to avoid this problem the switch includes a delay equalizer circuit 18 for causing a delay to those bits which have not incurred a switch memory cycle delay. The delay equalizer circuit 18 comprises a 64×1 bit RAM 29 which sequentially receives data from highway β and by means of a 4 MH$_z$ read/write clock signal on 19 provides the data in the same sequence on RAM output 20. The data on output 20 however is delayed by 16 μS relative to the data on highway β.

A by-pass connection 21 in the delay equalizer circuit 18 enables data on highway β to by-pass the RAM 29. The RAM output 20 and by-pass connection 21 are provided to AND/OR select gate 22 which switches one or the other to highway γ under the control of a signal on connection 23. Connection 23 is the output of a comparator 24 which compares the READ and WRITE addresses controlling the switch memory 12. In other words comparator 24 compares the address from counter 13 with the address from control memory 14 and if the address from control memory 14 is equal to or less than the address from binary counter 13 at a particular instant of time then comparator 24 provides an output on 23 to cause the delayed data from RAM 29 to be switched to highway γ. If the address from control memory 14 is greater than the address from counter 13 no output appears on 23 and thus the non-delayed data on by-pass 21 is switched via gate 22 to highway γ.

Thus the data on highway γ is all delayed by one switch cycle and after demultiplexing in demultiplexor 15 is word aligned between the sixty-four outputs of demultiplexor 15. Therefore data received at the respective channel decoders 25 is word aligned.

A synchronization signal generator 26 generates a synchronization signal for synchronizing the encoders at the switch input and a similar signal must also be applied at the correct point in time to the decoders 25 at the switch output. In order to achieve this a delay compensator circuit comprising flip-flop 27 is incorporated in the connection 28 from synchronization generator 26 to the decoders 25. The flip-flop 27 is clocked at 64 KH$_z$ and thus inserts a 16 μs delay in the synchronization signal to the decoders to compensate for the combined delay introduced by the switch memory 12 and equalizer circuit 18.

FIG. 2 shows one switch group. Similar switch groups may be added to expand the switch size to handle any desired number of inlets. The principle of the invention is of course applicable to multistage digital switches for example, time-space-time switches.

Furthermore, the invention is applicable to switches having primary PCM multiplexers (shared codecs) as apposed to the per channel codecs described above. In such a situation the basic equalizer circuit is the same as that described above. However the switch differs in that it is necessary to convert word interleaved bitstreams at the switch input into a bit interleaved bitstream as appears on the highway α described above. This can be achieved by use of RAMS in the highway α. For example, consider a two input multiplexor at the switch input, each input of which contains thirty-two channels constituting a 2.048 Mb/$_s$ word interleaved bitstream. The output of the switch multiplexor would comprise a 4.096 Mb/$_s$ bit interleaved bitstream but the bitstream would not be the same as that on highway α in the embodiment above because the bitstream would comprise alternately bits from the entire words of two channels and then bits from the entire words of a further two channels and so on. Such a bit interleaved bitstream may be converted to a bitstream as on highway α by means of a bit to word converter comprising RAM'S (not shown) which are written into and read from in such a way as to achieve the required interleaving. Since such reformatting does not constitute a part of the present invention it will not be described in detail here as a person skilled in the art would readily appreciate a means for achieving the desired result. A reverse conversion takes place after switching. With shared codecs framing and word synchronization are contained in the frame structure of the primary multiplex. The effect of the TDM switch is, as before, to cause a delay on some channels and thus cause a 'slip' in the word boundaries as in the embodiment described above and a delay equalizer is used to obtain an identical delay on all channels. However, in this latter case a delay compensator is introduced to restore the correct word boundaries. The compensator is built into the bit to word converter and operates by modifying the read/write sequence of the converter. In this case it must be remembered that the encoders are frame and word synchronized.

It will be appreciated by persons skilled in the art that the invention described herein provides an economical and convenient way of bit switching word formatted data. In fact it provides the advantage that there is very little modification necessary to existing delta switches in order to use them for switching word formatted data such as PCM data.

I claim:

1. A method for serially bit-switching digital word synchronized (word aligned) data between inputs and outputs of a digital switch comprising the steps of converting data from different incoming channels to said switch into a bit interleaved bitstream on a single data highway, bit switching said bitstream via a switch memory, determining those bits which incur a switch memory delay as opposed to those bits which do not incur a said delay, applying a said delay to said bits which do not incur said delay, and applying a said delay to a synchronization signal for synchronizing the word boundary of outgoing data from the switch relative to a synchronization signal for synchronizing the word boundary of incoming data to the switch.

2. A switch for serially bit-switching digital word synchronized (word aligned) data between inputs and outputs of said switch, wherein said switch comprises circuit means for converting data from different incoming channels to said switch into a bit interleaved bitstream on a single data highway, a switch memory for receiving sequentially said data from said highway and bit switching said data to rearrange the order of data in said bitstream according to connections to be made through the switch, further circuit means for determining those bits through the switch which incur a switch memory cycle delay as opposed to those bits which do not incur a said delay, a delay equalizer circuit for applying a said delay to those bits which do not incur a switch memory cycle delay and a delay compensator circuit for delaying a synchronization signal for synchronizing the word boundary of outgoing data from the switch relative to a synchronization signal for synchronizing the word boundary of incoming data to the switch.

3. A switch according to claim 2, wherein said further circuit means comprises a comparator for comparing address information for sequentially and cyclically writing into said switch memory with address information for random reading from said switch memory and providing an output when said read address is equal to or less than said write address, the output of said comparator being provided to said delay equalizer circuit to cause said delay equalizer circuit to apply said delay.

4. A switch according to claim 3, wherein said delay equalizer circuit includes a random access memory (RAM) for sequentially receiving the rearranged data bits from said switch memory and cyclically writing the bits into successive locations thereof, said rearranged bits being cyclically read from said RAM so as to incur a said delay, said delay equalizer circuit also including a bypass connection whereby data from said switch memory is caused to bypass said RAM and an AND/OR gate arrangement to switch either the data bits from said RAM or from said bypass connection to the switch output depending respectively on whether said output of said comparator is present or not at said equalizer circuit.

* * * * *